United States Patent
Houghton et al.

(10) Patent No.: US 6,854,658 B1
(45) Date of Patent: Feb. 15, 2005

(54) VALVE SYSTEM FOR SERVO CONTROL OF FLUID FLOWS

(75) Inventors: Bradley James Houghton, Auckland (NZ); Peter James Jeromson, Auckland (NZ); Jamie Jon Aorangi Wilkinson, Auckland (NZ); Peter Stephen Barnes, Auckland (NZ); Giscard Hubertus Theodoor Rutten, Auckland (NZ)

(73) Assignee: American Standard International, Inc., Piscataway, NJ (US)

( * ) Notice: Subject to any disclaimer, the term of this patent is extended or adjusted under 35 U.S.C. 154(b) by 0 days.

(21) Appl. No.: 09/319,764

(22) PCT Filed: Dec. 12, 1997

(86) PCT No.: PCT/NZ97/00168

§ 371 (c)(1),
(2), (4) Date: Sep. 9, 1999

(87) PCT Pub. No.: WO98/26339

PCT Pub. Date: Jun. 18, 1998

(30) Foreign Application Priority Data

Dec. 12, 1996 (NZ) .................................................. 299927

(51) Int. Cl.[7] .............................................. G05D 23/13
(52) U.S. Cl. ............................. 236/12.12; 137/625.41; 236/12.19; 251/129.11
(58) Field of Search .................... 236/12.17, 12.19, 236/12.12, 12.15; 251/129.11, 301, 304; 137/625.41

(56) References Cited

U.S. PATENT DOCUMENTS

| | | | |
|---|---|---|---|
| 3,363,536 A | | 1/1968 | Dean, Jr. .................. 236/49.5 |
| 3,363,538 A | * | 1/1968 | Dean, Jr. |
| 3,810,602 A | * | 5/1974 | Parkinson ................... 251/304 |
| 3,987,819 A | * | 10/1976 | Scheuermann ......... 137/625.41 |
| 4,243,063 A | * | 1/1981 | Parkison ................ 137/625.41 |
| 4,327,758 A | * | 5/1982 | Uhlmann ............... 137/625.41 |
| 4,431,028 A | | 2/1984 | Hendrick |
| 4,558,817 A | * | 12/1985 | Kiendl .................... 236/12.12 |
| 4,610,393 A | | 9/1986 | Rodriguez |
| 4,611,757 A | * | 9/1986 | Saether .................... 236/12.17 |
| 4,653,538 A | | 3/1987 | Tsutsui et al. |
| 4,673,160 A | | 6/1987 | Tolley |
| 4,700,885 A | * | 10/1987 | Knebel .................... 236/12.16 |
| 4,761,836 A | | 8/1988 | Tsutsui et al. |
| 4,889,315 A | * | 12/1989 | Imanaga ................ 251/129.03 |
| 5,014,748 A | * | 5/1991 | Nogami et al. ........ 137/625.65 |
| 5,358,177 A | | 10/1994 | Cashmore |
| 5,417,083 A | * | 5/1995 | Eber ........................... 62/528 |
| 5,504,950 A | | 4/1996 | Natalizia et al. |

FOREIGN PATENT DOCUMENTS

| | | |
|---|---|---|
| DE | 2524105 | 9/1983 |
| DE | 3832676 | 4/1990 |
| EP | 0042523 | 12/1981 |
| EP | 0 272 669 | 6/1988 |
| EP | 0 297 883 | 1/1989 |

* cited by examiner

Primary Examiner—William E. Tapolcai
(74) Attorney, Agent, or Firm—Young & Thompson (57) ABSTRACT

The present invention provides a mixing valve (30) suitable for electric motor (38) actuation, particularly stepper motor actuation. It also provides a servo mixing valve system, which includes stepper motors for actuation and optionally includes a solenoid switched outlet manifold and a combination mixing and dye. The present invention also provides an actively controlled bathroom shower mixing system including temperature formation feedback.

26 Claims, 8 Drawing Sheets

VALVE SYSTEM FOR SERVO CONTROL OF FLUID FLOWS

The present invention relates to valves for controlling the flow of fluids in a fluid supply system. More particularly, it relates to valves suitable for active servo control of fluid flows. Further, in particular, it relates to valves for active servo control of fluid flows in a fluid mixing unit.

BACKGROUND OF THE INVENTION

Valve systems suitable for being electrically controlled and actuated are known for a wide variety of applications. These add the many advantages of control electronics and computing to their applications.

One such application, is the control of flow for shower mixers, hand basin mixers, and the like.

A commonly used conventional electrically controllable flow valve includes a conventional faucet valve and an electric motor to actuate the spindle of the faucet valve. The electric motor turns the spindle to axially move the disc of the faucet valve and restrict flow emerging from the disc ring of the faucet valve. Typically, multiple revolutions of the spindle are required to actuate the disk through its working range. Also the spindle is mounted and moved by means of a thread arrangement which introduces friction. Therefore, this type of valve is not well suited to servo control. Also, movement of the disk to close the valve must work against the supply pressure of the fluid.

Accordingly, it is an object of the present invention to provide a fluid control valve which overcomes or obviates the disadvantages of existing systems, or at least to provide the public with a useful choice.

It is also an object of an embodiment of the present invention to provide a fluid control valve adapted to servo control the flow of fluid through the valve, or at least to provide the public with a useful choice.

It is an object of an embodiment of the present invention to provide a servo controlled mixing of supplied fluids in given ratios, or at least to provide the public with a useful choice.

It is an object of an embodiment of the present invention to provide an actively controlled shower mixer which employs temperature feedback, or at least to provide the public with a useful choice.

SUMMARY OF THE INVENTION

Accordingly, in a first aspect, the invention may broadly be said to consist in a fluid mixing valve suitable for servo control of fluid flows, comprising: a valve body having at least two fluid inlet ports and at least one fluid outlet port; a valve seat having a valve seat contact surface and an outlet valve member having an outlet member contact surface, the valve member being rotatable about a first axis; said valve seat having two adjacent inlet apertures there through separated by a dividing piece, and said valve seat having a closed area opposite the inlet apertures, a first said inlet aperture communicating with a first of said two inlet ports, and a second said inlet aperture communicating with a second of said two inlet ports, a barrier on the inlet side of the valve seat separating the fluid flow from said at least two inlet ports so that the two supplies of fluids do not mix until after they have passed through the two inlet apertures in the valve seat; said valve member having an outlet aperture there through and a sealing area, said outlet aperture communicating with said at least one outlet port, the valve member contact surface and the valve seat contact surface being arranged in substantially planar sealing contact with one another, and the valve member is capable of rotation relative to the valve seat, wherein the outlet aperture of the valve member is substantially sector shaped at the plane of the valve member contact surface, with its sector apex at or close to the point of intersection of the first axis with the valve member and with its arc at or close to the outside of the valve member, and the two adjacent inlet apertures of the valve seat are each substantially sector shaped at the plane of the valve seat contact surface with each having its sector apex close to the point of intersection of the first axis with the valve seat, and the sealing area of the valve member is greater than or equal to the combined area of the two adjacent inlet substantially sector shaped apertures so that the sealing area of the valve member can cover and close the two adjacent inlet substantially sector shaped apertures, whereby the valve member can be rotated about the first axis between a shut off position where both of the inlet apertures are closed by the valve member, a first inlet opened position where the first inlet aperture and the outlet aperture are aligned to allow fluid to flow from the first inlet port through the first inlet aperture via the outlet aperture to the outlet port, whilst at the same time the second inlet aperture is closed by the valve member, a second inlet opened position where the second inlet aperture and the outlet aperture are aligned to allow fluid to flow from the second inlet port through the second inlet aperture via the outlet aperture to the outlet port, whilst at the same time the first inlet aperture is closed by the valve member, and a mixing position wherein the outlet aperture overlaps with both of the inlet apertures to allow fluids to flow from said two inlet ports through the two inlet apertures and through the outlet aperture, and mix downstream of the outlet aperture so that the fluids can exit the outlet port.

Preferably the valve member is a first valve disk.

Preferably the valve seat is a second valve disk and has an opposing surface on the other side of the disk from the contact surface.

Preferably the two adjacent inlet apertures of the second valve disk have a greater area in the plane of the contact surface of the second valve disk than in the plane of the opposing surface of the second valve disc.

Preferably the substantially sector shaped outlet aperture of the valve member at the plane of the valve member contact surface has an angle of about 120 degrees at its apex.

Preferably the two adjacent substantially sector shaped inlet apertures of the valve seat at the plane of the valve seat contact surface, each have an approximately 90 degree apex.

Preferably the outlet aperture in the valve member is in the shape of a removed sector.

Preferably the valve seat contact surface has a recessed region. In a second aspect, the invention may broadly be said to consist in a servo actuated fluid mixing valve, comprising: a valve body having at least two fluid inlet ports and at least one fluid outlet port; a servo actuator attached to said valve, a valve seat having a valve seat contact surface and an outlet valve member having an outlet member contact surface, the valve member being capable of being rotated about a first axis by said servo actuator, said valve seat having two adjacent inlet apertures there through separated by a dividing piece, and said valve seat having a closed area opposite the inlet apertures, a first said inlet aperture communicating with a first of said two inlet ports, and a second said inlet aperture communicating with a second of said two inlet ports, a barrier on the inlet side of the valve seat separating the fluid flow from said at least two inlet ports so that the two supplies of fluids do not mix until after they have passed through the two inlet apertures in the valve seat; said valve member having an outlet aperture there through and a sealing area, said outlet aperture communicating with said at least one outlet port, the valve member contact surface and the valve seat contact surface being arranged in substantially planar sealing contact with one another, and the valve member is capable of rotation relative to the valve seat, wherein the outlet aperture of the valve member is substantially sector shaped at the plane of the valve member contact surface, with its sector apex at or close to the point of intersection of the first axis with the valve member and with its arc at or close to the outside of the valve member, and the two adjacent inlet apertures of the valve seat are each substantially sector shaped at the plane of the valve seat contact surface with each having its sector apex close to the point of intersection of the first axis with the valve seat, and the sealing area of the valve member is greater than or equal to the combined area of the two adjacent inlet substantially sector shaped apertures so that the sealing area of the valve member can cover and close the two adjacent inlet substantially sector shaped apertures, whereby the valve member can be rotated about the first axis between a shut off position where both of the inlet apertures are closed by the valve member, a first inlet opened position where the first inlet aperture and the outlet aperture are aligned to allow fluid to flow from the first inlet port through the first inlet aperture via the outlet aperture to the outlet port, whilst at the same time the second inlet aperture is closed by the valve member, a second inlet opened position where the second inlet aperture and the outlet aperture are aligned to allow fluid to flow from the second inlet port through the second inlet aperture via the outlet aperture to the outlet port, whilst at the same time the first inlet aperture is closed by the valve member, and a mixing position wherein the outlet aperture overlaps with both of the inlet apertures to allow fluids to flow from said two inlet ports through the two inlet apertures and through the outlet aperture, and mix downstream of the outlet aperture so that the fluids can exit the outlet port.

Preferably the servo actuator includes a stepping motor.

Preferably the servo actuated fluid mixing valve further includes a controller means.

Preferably the servo actuated fluid mixing valve further includes a sensing means which is positioned and adapted to sense at least one parameter relating to any fluid which passes through the at least one fluid outlet port, allowing feed-back control of the valve.

Preferably the servo actuated fluid mixing valve further includes a controller means.

Preferably the servo actuator includes a stepping motor.

Preferably the servo actuated fluid mixing valve further includes a user interface means.

Preferably the valve member is a first valve disk.

Preferably the valve seat is a second valve disk and has an opposing surface on the other side of the disk from the contact surface.

Preferably the two adjacent inlet apertures of the second valve disk have a greater area in the plane of the contact surface of the second valve disk than in the plane of the opposing surface of the second valve disc.

Preferably the substantially sector shaped outlet aperture of the valve member at the plane of the valve member contact surface has an angle of about 120 degrees at its apex.

Preferably the two adjacent substantially sector shaped inlet apertures of the valve seat at the plane of the valve seat contact surface, each have an approximately 90 degree apex.

Preferably the outlet aperture in the valve member is in the shape of a removed sector.

Preferably the valve seat contact surface has a recessed region.

DETAILED DESCRIPTION OF THE DRAWINGS

Figure 1:
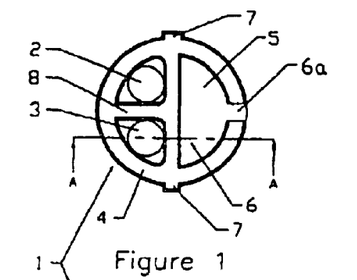
FIGS. 1 & 1A: Respectively show top and bottom views of a part of a valve in accordance with an embodiment of the present invention.
Figure 1A:
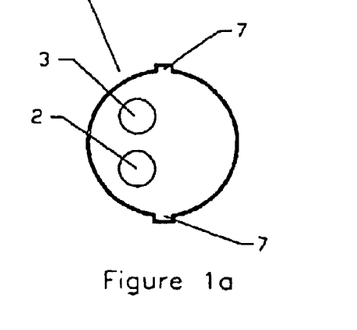
Figure 2:
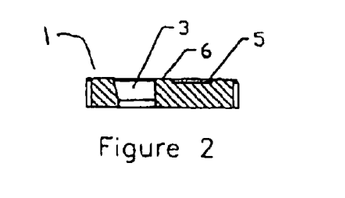
FIG. 2: Shows a side view of the part shown in FIGS. 1 and 1A.

FIGS. 1, 1A and 2 show an inlet valve member 1 which, in use, is aligned perpendicular to a flow of fluid through the valve. The inlet valve member 1 includes two apertures 2 and 3 through which fluid passes when the valve is open. Typically, these apertures 2 and 3 have a cross section that is sectorial or elliptical at one face of the valve member 1 and circular at the other, although any suitable cross sectional shape may be substituted. The apertures 2 and 3 are, typically, formed circular at the face of the inlet valve member 1 which is in contact with the fluid supply and the size of the circles are minimised, within constraints of required flow. In use, only the apertures 2 and 3 and a minimal area around the apertures are in contact with the fluid supply to minimise pressure being exerted on the inlet valve member 1 which would increase friction between the inlet valve member 1 and an outlet valve member 10, described with reference to FIG. 3 below. Also, typically, the apertures 2 and 3 are positioned inward from the periphery of the valve member 1 to provide an area of the valve member 1 peripheral to the apertures against which another member may abut to seal the apertures 2 and 3 when required. However, suitable alternative sealing arrangements will be apparent to those skilled in the art.

The apertures 2 and 3 may have different relative sizes to account for relative differences in supply pressures or viscosity, for example.

The inlet valve member may typically have a recessed region 5 formed in the contact side 6 of the inlet valve member 1 and grooves 6*a* to reduce friction with any flat surface in contact with the contact side 6 of the inlet valve member 1. Such friction reduction measures reduce the actuation torque required by the valve. The edges of the inlet valve 1 may, typically, be bevelled to prevent chipping of the edges of the valve member 1.

The inlet valve member includes alignment tabs 7 with which it may be held in a given orientation.

Figure 3:
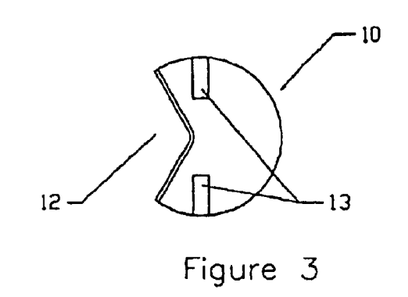
FIG. 3: Shows a plan view of another part of a valve according to the same embodiment of the present invention.
Figure 4:
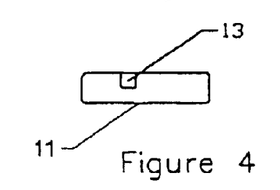
FIG. 4: Shows a side view of the parts shown in FIG. 3.

FIGS. 3 and 4 show the outlet valve member 10. The valve member 10 has a contact surface 11 which may be flat so that the outlet valve member 10 may be sealingly abutted against the contact side 6 of the inlet valve member 1 in use to seal the apertures 2 and 3 when required.

The outlet valve member 10 is of the form of a disk with a removed sector 12. It will be apparent to those skilled in the art that alternative shapes to the removed sector 12 may suitably be substituted and that the shape may be optimised for particular applications. In use, the outlet valve member 10 is abutted and aligned with the inlet valve member 1 and depending on its orientation with respect thereto, variably impedes the flow of fluid emerging from the apertures 2 and 3. The flow will be completely impeded and the apertures 2 and 3 sealed when the removed sector 12 of the outlet valve member 10 does not overlap either of the apertures 2 or 3. The flow of fluid through each of the apertures 2 and 3 can be varied from nil flow to an unimpeded flow or a controlled ratio of flow through each conduit. Thus, the outlet valve member 10 and input valve member 1 may be combined to form a mixing valve. Alternatively, they may be reversed and combined to form a diverting valve. Alternatively, an inlet valve member 1 having only one aperture may be used to control the flow of a single fluid, or both apertures of the inlet valve member 1 may communicate with a single fluid supply for the same purpose.

Typically, each aperture 2 and 3 communicates with a separate fluid supply conduit, not shown, and the output of the valve communicates with a single output conduit so that the valve allows the variable mixing of the fluids from the two supply conduits.

The outlet valve member 10 includes actuation recesses 13 by which it may be rotated.

The size of the removed sector 12 in conjunction with the size of the apertures 2 and 3 determines the maximum flow rate for given fluids at given temperatures and pressures.

Figure 5:
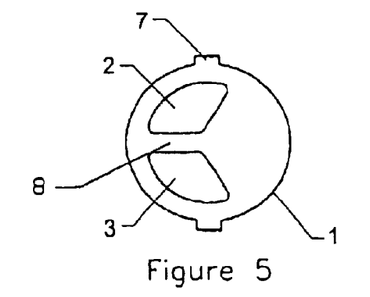
FIG. 5: Shows a part of a valve corresponding to the parts shown in FIGS. 1 and 2 according to an alternative embodiment of the present invention.
Figure 6:
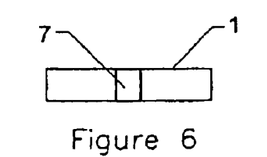
FIG. 6: Shows a side plan view of a part shown in FIG. 5.

FIGS. 5 and 6 show an alternative inlet valve member 1 which includes apertures 2 and 3 having a sectorial cross-section of greater area than those of the inlet valve member shown in FIGS. 1 and 2. It will be clear to those skilled in the art that other conduit sizes and shapes may be substituted as applicable to given applications of the valve.

Figure 7:
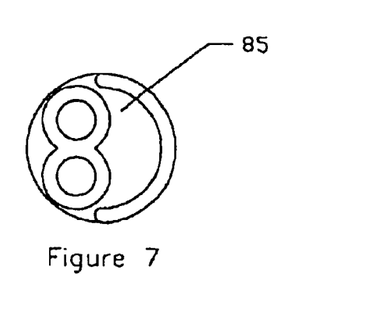
FIG. 7: Shows a gasket which corresponds to the part of the valve shown in FIGS. 1, 1A and 2.
Figure 8:
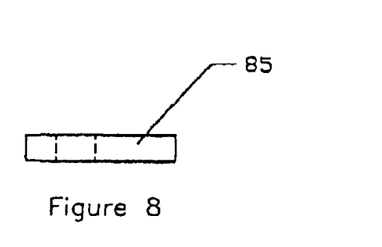
FIG. 8: Shows a side view of the gasket shown in FIG. 7.

FIGS. 7 and 8 show a seal, or gasket, 85 used in conjunction with the inlet valve member 1 shown in FIGS. 1, 1A and 2. The use of the gasket 85 is explained with reference to FIG. 11 below.

Figure 9:
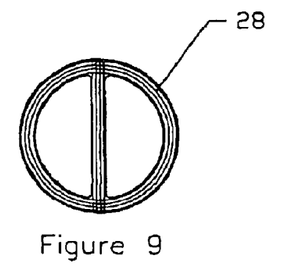
FIGS. 9 & 9A: Shows part of a gasket used to seal either of the parts shown in FIGS. 1 and 2 or 5 and 6.
Figure 9A:
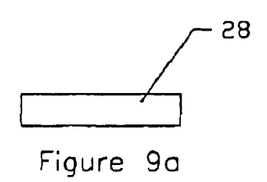
Figure 10:
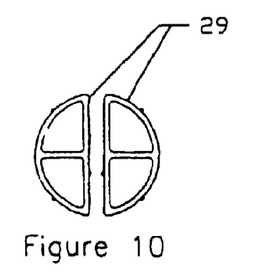
FIGS. 10 & 10A: Shows two reinforcement members for the gasket shown in FIG. 9.
Figure 10A:
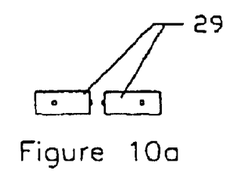

FIGS. 9 to 10*a* show alternative gasket elements 28 and 29, which are combined to form a gasket for sealing inlet valve members 1 shown in FIGS. 5 and 6. The gasket elements 28 are, typically, formed from silicon, rubber or other suitable deformable material, and gasket elements 29 are, typically, formed from plastic and serve the purpose of reinforcing the gasket element 28.

Figure 11:
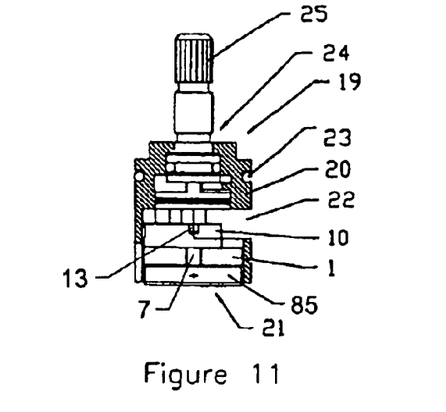
FIG. 11: Shows a valve assembly incorporating the parts shown in FIGS. 1 to 10 of either embodiment.

FIG. 11 shows a valve assembly 19, including the inlet valve member 1 and outlet valve member 10 of either of the embodiments described above. These valve members are fitted inside a valve chassis 20. The removed sector 12 of the outlet valve member 10 and the valve chassis 20 define an outlet aperture. The valve chassis 20 is open at one end to form a valve chassis inlet 21. A valve chassis outlet 22 is formed in the side of the valve chassis 20. In use, the valve assembly 19 is fitted into a valve housing 35 as described with reference to FIG. 12 below. An O-ring 23 is used to seal the valve assembly 19 in the valve housing 35.

The valve assembly 19 includes a spindle assembly 24, which engages the actuation recesses 13 of the outlet valve member 10. The outlet valve member 10 can be rotated by rotation of the spindle assembly 24, which includes a spline 25 formed at one end to facilitate turning of the spindle assembly 24.

The inlet valve member 1 is, typically, held in fixed alignment by the alignment tabs 7 which engage corresponding alignment recesses, not shown, in the valve assembly chassis 20. The spindle assembly 24 is sealed within the valve assembly chassis 20 by use of O-rings and washers.

The gasket 85 or that formed from gasket members 28 and 29 is fitted into the inlet end of the valve assembly chassis 20.

The working of the valve assembly is illustrated below with reference to hot and cold water, each being supplied by one separate conduit 2 or 3, as would be the case with an application such as a shower temperature control mixing valve.

The outlet valve member 10 is initially orientated so as to cover or seal both of the apertures 2 and 3 of the inlet valve member 1. The spindle 24 is then turned in an opening direction to initially uncover part of the aperture 2, for example, which is supplied with cold water. Continued turning in the same direction increasingly uncovers the aperture 2. Eventually, continued turning will uncover the other aperture 3 to which hot water is supplied and partially cover the aperture 2. The ratio of hot and cold water may be adjusted by turning the spindle 24 in the same direction or in the opposite direction. Having sectorial inlet and outlet apertures, provides that the valve has a substantially linear flow response with respect to rotational angle.

At a mid point, equal portions of each aperture are uncovered and depending on the chosen shape and size of the apertures 2 and 3 and sector 12, this may correspond to partial covering of both apertures 2 and 3.

Further turning may result in only the aperture 3 being uncovered and only hot water being supplied to the valve chassis outlet 22.

Figure 12:
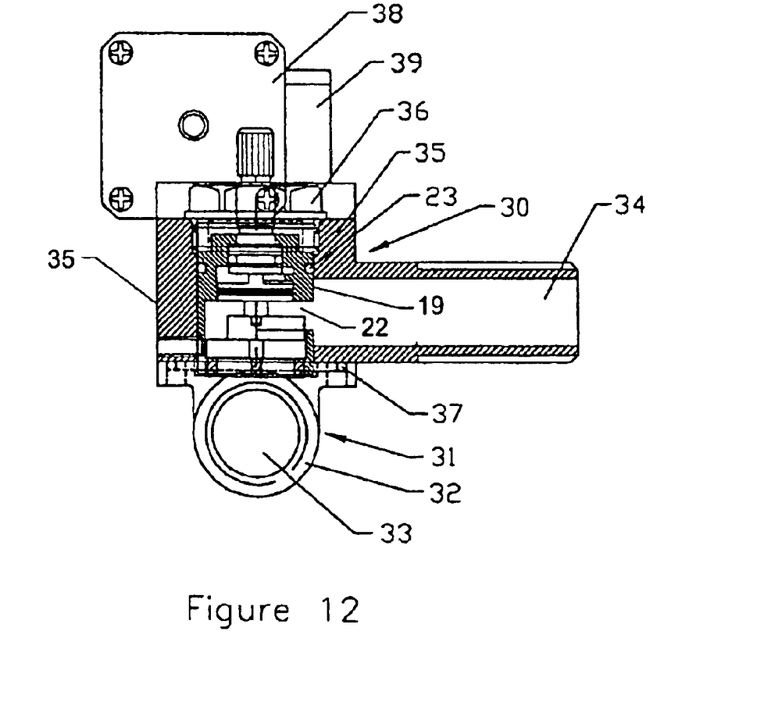
FIG. 12: Shows a servo valve system according to an embodiment of the present invention and incorporating the valve assembly shown in FIG. 11.

FIG. 12 shows a side view of a servo valve system 30, which includes the valve assembly 19 described above.

The servo valve system 30 also includes an inlet manifold 31 having two inlets 32, one of which is shown in FIG. 12 and the other of which is positioned directly behind a dividing wall 33, as shown in FIG. 12. A dividing piece 8 of the inlet valve member 1, which divides the two apertures 2 and 3 is aligned with the dividing wall 33. The gasket 28 or

85 is aligned accordingly. It may be preferable that the gasket 28 or the inlet manifold 31 are shaped like gasket 85 so that only the apertures of the inlet valve member 1 are in contact with the fluid supply as otherwise force exerted on the inlet valve member 1 causes increased friction between the inlet valve member 1 and the outlet valve member 10 which requires an increase actuation torque.

The servo valve system 30 includes an outlet pipe 34 connected at the outlet 22 of the valve assembly 19. Typically, but not necessarily, the outlet pipe 34 is integrally formed from the servo valve system housing 35.

The valve assembly 19 is secured in the housing 35 with an annular cap 36 and sealed at the top with the O-ring 23.

The inlet manifold 31 is sealed to the housing 35 with an O-ring 37.

The servo valve system 30 includes a stepper motor 38, or some other automated driving device such as a DC motor, AC motor or hydraulic motor, to actuate the spindle 24 at the spline 25 through a gear box 39. It will be apparent to those skilled in the art that a wide variety of stepper motors may be used with suitable gear boxes or that a spline 25 of suitable diameter may eliminate the need for a gearbox 39 in some cases. By the use of the friction reducing measures described above, a minimally sized stepper motor may be used reducing the size and required resources of the device.

The servo valve system 30 may include one or more sensors, not shown, in the input manifold 31, but more particularly in the outlet pipe 34 to provide feedback for the control of the servo valve system 30.

The sensors may include temperature sensors. For example, a thermistor may be inserted through the side of the outlet pipe 34 to monitor temperature of the water, say, in the outlet pipe 34 and to allow suitable adjustment by the stepper motor 38 to control temperature of water in the outlet pipe 34 in the case where different temperature fluid supplies are connected to the inlet manifold 31.

Figure 13:
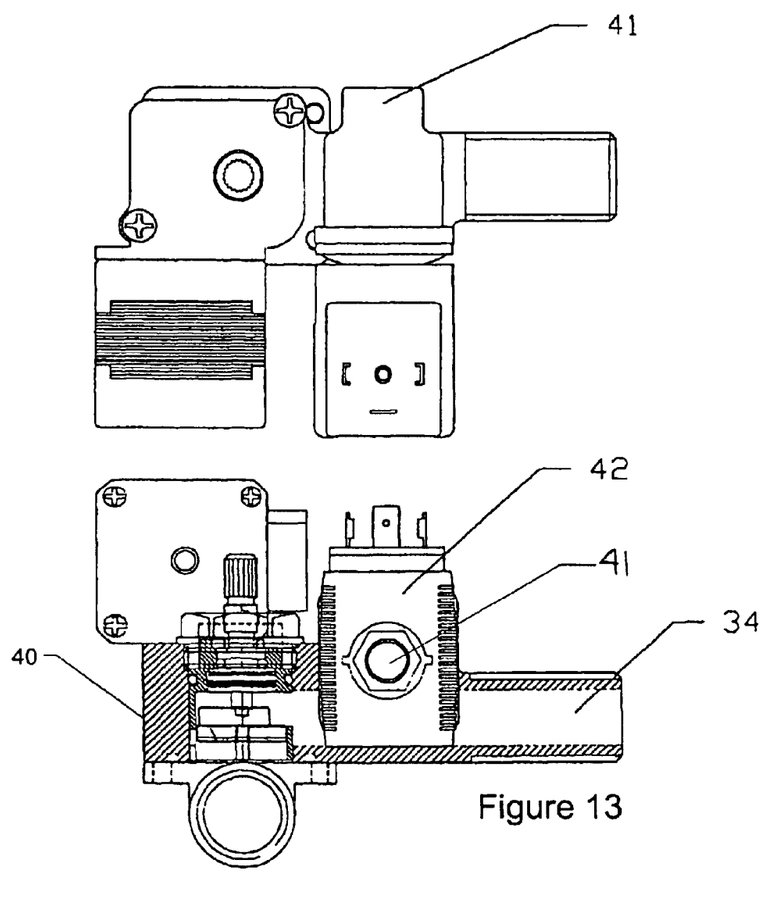
FIG. 13: Shows a servo valve system according to an alternative embodiment and incorporating the valve assembly shown in FIG. 11.

FIG. 13 shows a servo valve system 40 according to an alternative embodiment of the present invention. The servo valve system 40 differs from the servo valve system 30 described above, only by the inclusion of an extra output pipe 41 which may be opened or closed by way of a solenoid valve 42. In one application, the outlet pipe 34 supplies a hand held shower head and the output pipe 41 supplies a midriff height shower jet. The solenoid valve 42 opens and closes water supplied to the hand held shower head as desired.

Figure 14:
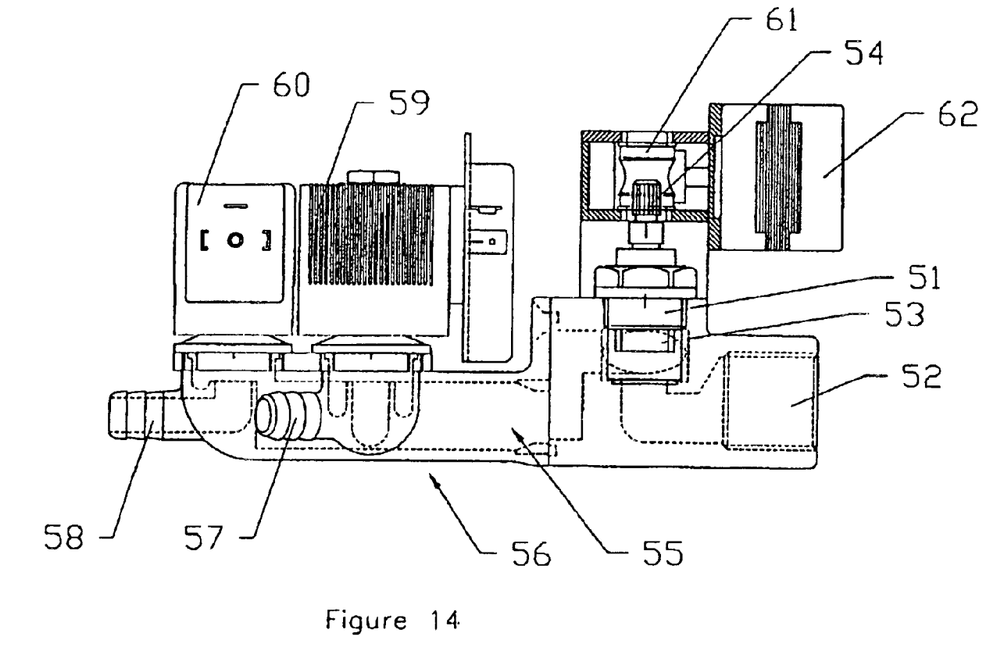
FIG. 14: Shows a servo valve system according to an alternative embodiment of the present invention.

FIG. 14 shows a side view of a servo valve system 50 according to another aspect of the present invention.

The servo valve system 50 includes two individual valves such as 51 shown each being supplied by individual inlet pipes, such as 52 shown.

The valves consist of conventional apertured ceramic disks mounted in a chassis with two outlets on opposite sides of the chassis.

The ceramic disks each include two opposing apertures, typically sectorial in shape. To open the valve, one of the disks is rotated by way of the spindle so that the apertures of both disks overlap.

The outlets of both valve assemblies feed a single intermediary conduit 55. Each valve is actuated at the respective spline 54 of the respective spindle 53 by a respective gearbox 61 and a respective stepper motor 62.

As each valve controls the inflow of fluid from a separate inlet, the ratio of fluids from each inlet as well as the total flow from both inlets can be adjusted.

Typically, the stepper motors are controlled such that once a desired flow in the intermediary pipe 55 is achieved, an adjustment to one valve is accompanied by a negative adjustment of the other, so that the mix of fluid in the intermediary pipe 55, or temperature, can be adjusted whilst the pressure is maintained. This may be modified to take account of relative differences in supply pressures that occur where non mains pressure water supply systems are used.

The servo valve system 50 also includes an outlet manifold 56 which, typically, has two final outlets such as 57 and 58, each including a solenoid valve such as 59 and 60.

One embodiment incorporating this aspect of the present invention is intended for use with a shower unit, which has two fixed shower heads, one at head height and one at midriff height, for example. This embodiment is supplied with hot and cold water at separate inlets and includes a thermistor inserted into the intermediary chamber 55 to provide feedback on temperature for appropriate control of the two valves such as 51. Thus, a drop in one or the other of the water supplies will be compensated in terms of temperature without the need for a pressure feedback, although this may be included if desired.

This embodiment is able to compensate for changes in supplied pressure of either or both the hot and cold water so that a constant desired temperature and constant desired pressure is provided at the shower heads. It may also compensate for changes in pressure at one or two of the final outlets such as 57 and 58 in the event that one or two of the other final outlets are opened or closed.

One preferred embodiment of the present invention is directed for use in bathroom showers where it provides relatively constant temperature water for shower heads. It will be clear to those skilled in the art that the bathroom shower is merely an example application and that many analogous applications of this embodiment exist and that the mixing of water of different temperatures may be analogous to the mixing of fluids having other physical or chemical properties. A few examples are ph, viscosity, dielectric constant, or content of a given chemical or biological agent.

The bathroom shower mixing system is supplied with two fluids, hot and cold at given pressures. These are mixed by a servo valve system according to any of the embodiments described above and information on the temperature of the mixed fluid is fed back to the controller of the servo valve system. In the case of the servo valve system 50 being used, information on pressure can be estimated by the known position of the stepper motors and so pressure may be maintained.

The temperature sensors are typically negative temperature coefficient sensors. Some inherent nonlinearity of the temperature signals may be partially compensated with the sensor electronics before quantisation by the microprocessor. The microprocessor contains software that compares the measured temperature with a predefined reference temperature. From this, and with an appropriate control algorithm, again, the microprocessor determines the required position of the stepper motors, and therefore, the valve members 1 and 10. It will be understood by those skilled in the art that calibration of the system will be necessary and suitable calibration will be apparent.

To maintain excellent speed and torque characteristics whilst maintaining good angular resolution and minimal microprocessor resource, the stepper motors are, preferably, operated at two speeds using two different stepping modes.

The motor is "full-stepped" for large displacements. This optimises the speed and torque response.

The motor is "half-stepped" for temperature adjustments. This optimises the resolution of movements.

The motors are half-stepped at the start of an acceleration from rest and later full-stepped. Similarly, the motors are half-stepped at the end of a deceleration to rest and after full-stepping. These measures reduce mechanical shock and overcome inertia of the motor, gearbox and valve assembly.

The mixer system also includes protection against the valve being left open in the event of loss of electrical power. Two methods are employed in the preferred embodiment. One method includes the use of batteries which store enough energy to close the valve assembly when power loss is detected. The other method includes the use of solenoids that require power to remain open and, thus the flow is shut off when the power fails.

Figure 15:
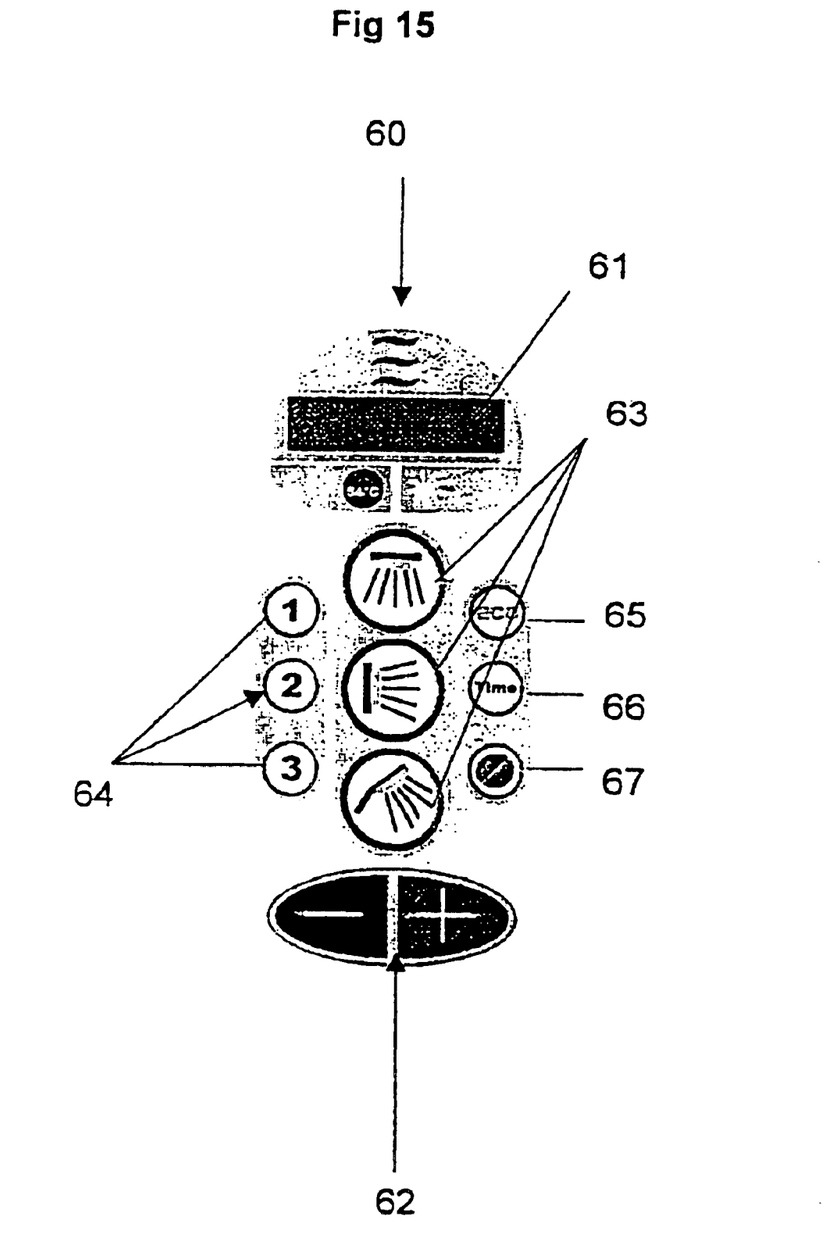
FIG. 15: Shows the layout of a user interface for a servo valve system according to an alternative embodiment of the present invention.

FIG. 15 shows a user interface 60 for a preferred embodiment of the bathroom shower mixing system that includes the servo valve system 50.

The user interface 60 includes an LCD display 61 for displaying the desired and/or actual water temperature and ± button system 62 for adjusting the desired water temperature.

A set of three buttons 63 are also included to switch on/off a shower rose, perhaps, fixed at head height, shower jets, perhaps, fixed at midriff height and a hand held shower rose. The set of buttons 64 are included for user programmable preset functions for, perhaps, temperature and combinations of outlets and lights. Button 65 controls an economy mode which may reduce water flow by 25% or 50%. Button 66 may be used to set the shower duration with increments of 30 seconds. Button 67 switches on/off a "Swedish" cycle which fluctuates the shower temperature between hot and cold.

Figure 16:
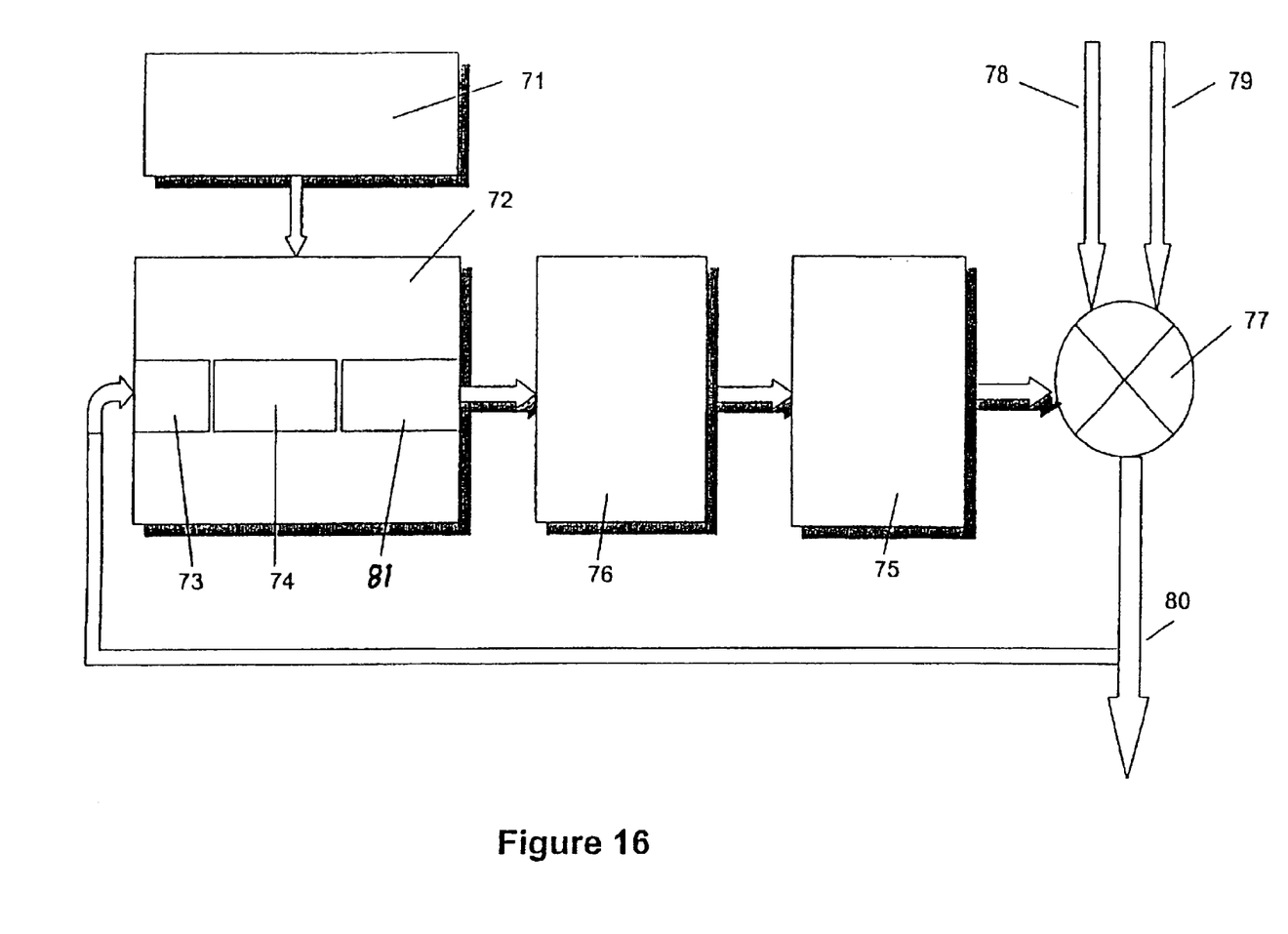
FIG. 16: Schematically shows a mixing system according to an embodiment of the present invention.
Figure 17:
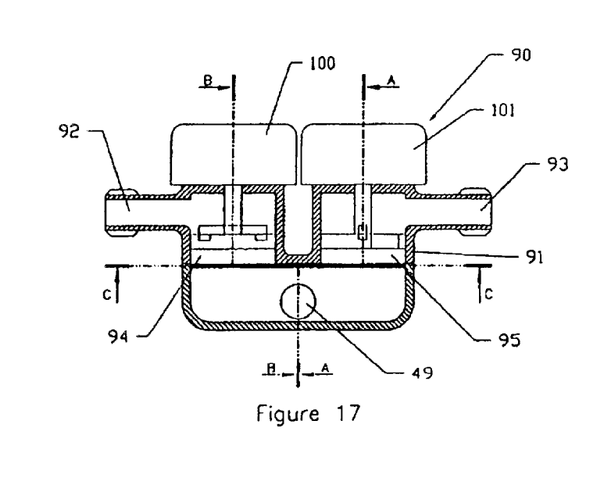
FIGS. 17–20: Show a combination mixing and diverting servo valve system according to a further embodiment of the present invention.
Figure 18:
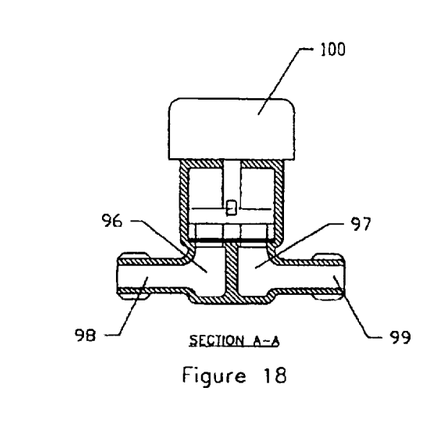
Figure 19:
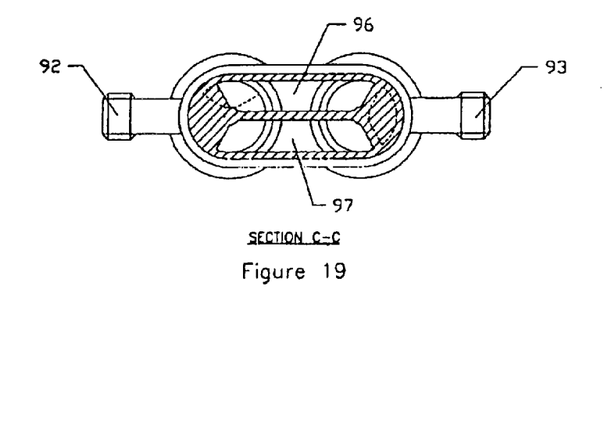
Figure 20:
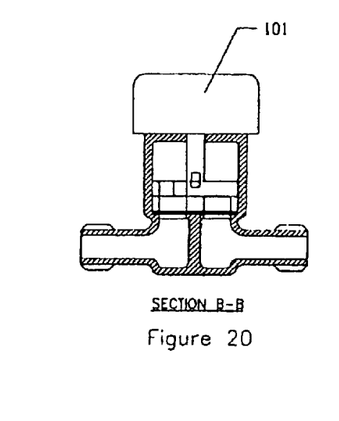

FIG. 16 schematically shows the operation of a servo valve system in accordance with an embodiment of the present invention.

Information on a desired value of a given parameter, such as temperature of fluid leaving the valve system, is received from the user interface 71. This information is fed to the system controller 72. The system controller 72 receives information from a sensor at the output of the valve system and includes an analogue to digital converter 73 to quantify the parameter value sensed by the sensor. The position of the stepper motor and gearbox 75 is then calculated by the microcontroller 74 and then converted to a stepper sequencer 81. The stepper motor and gearbox 75 are then driven by the stepper driver 76 to the required position. By actuation of the stepper motor and gearbox 75, the mixing assembly 77 is placed in a suitable position to mix the inlet fluids 78 and 79 to form an outlet fluid 80. Information on the given parameter is then fed back to the microcontroller 74 and the process repeated by way of adjustment.

It will be apparent to those skilled in the art that an alternative embodiment to those described above may include a valve assembly 19 used in reverse where water is fed into the outlet 22 from a single supply and from there diverted into either of the apertures 2 or 3 of the, now, outlet member 1.

FIGS. 17 to 20 show a further embodiment of the present invention. This is a combined valve provided to control temperature, pressure and also direct flow between alternative outlets. The fluid control valve 90 shown in FIGS. 17 to 20 may control the flow of hot and cold water independently to alternative outlets. The valve 90 may comprise a main body portion 91 having hot and cold water inlets 92 and 93 respectively. Valve members 94 and 95 may be provided in cooperating pairs acting to independently control the flow of hot and cold water respectively. These cooperating pairs may be prepared as pairs of valve members in accordance with valve members 1 and 10, although it will be preferable that the inlet valve member/and outlet is valve member 10 are swapped so that the "outlet" valve member 10 now communicates directly with the fluid supply.

It can be seen that the outlet from the valve members 94 and 95 allows flow into either one of two mixing chambers 96 and 97, each connected with separate outlets 98 and 99. Further, control of the valve members 94 and 95 and the relative rotation of one with the other is provided by stepper motors 100 and 101. These stepper motors may be controlled by a controller which may receive feedback information on temperature, or some other fluid parameter, at the outlet.

It can be seen that a valve of this type may be mounted on an installation to divert flow between a shower head or a bath spout, for example. The temperature at the outlet may be controlled through independent control over the flow of hot and cold fluid into the mixing chambers through the valve members 94 and 95 by control of the stepper motors 100 and 101. Furthermore, if the valve members 94 and 95 are independently controlled, the flow rate from the valve may be controlled by controlling the degree to which each of these valve members are opened.

This assembly allows servo control over the direction, flow rate and fluid temperature in a single installation.

In all the valve assemblies filters may be incorporated either within the valve or upstream to inhibit the entry of particulate matter into the valve which may affect the valve control.

Although the above described embodiments have been described in reference to the mixing of two fluids, it will be apparent to those skilled in the art that the valve or valve systems may find useful application in controlling the flow of a single fluid and that this is merely a simpler application than controlling the flow of two fluids. One possible example of a single fluid application is in the control of water supplied to a urinal. For single fluid applications, the valve member 1 described above may be used with both apertures 2 and 3 communicating with a single fluid supply. An alternative embodiment includes an inlet valve member, not shown, similar to the inlet member 1, but consisting of only one inlet aperture.

The present invention provides an effective servo valve system which can actively compensate for fluctuations in relative supply of two or more fluids. This may, for example, be desirable for shower mixers where the hot and cold water supply pressures may fluctuate due to use in another part of a building, for example.

Another embodiment of the present invention provides a servo valve system, which may actively adjust, for flow or relative and absolute changes in the supply pressure of two or more supplied fluids. This may, for example, be useful for shower mixing units where constant flow as well as constant temperature is desired. This may be particularly useful where the shower mixer has multiple outlets and adjustment of supply pressure is necessary to compensate for sudden changes in outflow through the outlets.

The present invention provides servo control valve systems which incorporate stepper motors which are, by their nature, suited to servo control applications and eliminate the need for systems for monitoring the position of the valves or motors.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope or spirit of the invention, as defined in the appended claims.

What is claimed is:

1. A fluid mixing valve for servo control of fluid flows, comprising:
    a valve body having at least two fluid inlet ports and at least one fluid outlet port;
    a valve seat having a fixed valve seat contact surface adjacent a movable outlet valve member having an outlet member contact surface, the outlet valve member being rotatable about a first axis;
    said valve seat having two adjacent inlet apertures there through separated by a dividing piece, and said valve seat having a closed area opposite the inlet apertures,
    a first said inlet aperture communicating with a first of said two inlet ports, and a second said inlet aperture communicating with a second of said two inlet ports, a barrier on the inlet side of the valve seat separating the fluid flow from said at least two inlet ports so that the two supplies of fluids do not mix until after they have passed through the two inlet apertures in the valve seat;
    said outlet valve member having an outlet aperture there through and a sealing area,
    said outlet aperture communicating with said at least one outlet port,
    the outlet valve member contact surface and the valve seat contact surface being arranged in substantially planar sealing contact with one another, the outlet valve member capable of rotation relative to the valve seat, wherein,
    the outlet aperture of the outlet valve member is substantially sector shaped at the plane of the outlet member contact surface, with a sector apex at or close to the point of intersection of the first axis with the outlet valve member and with an arc at or close to the outside of the outlet valve member, and
    the two adjacent inlet apertures of the valve seat are each substantially sector shaped at the plane of the valve seat contact surface with each having a sector apex close to the point of intersection of the first axis with the valve seat,
    the sealing area of the valve member is greater than or equal to the combined area of the two adjacent inlet substantially sector shaped apertures so that the sealing area of the outlet valve member can cover and close the two adjacent inlet substantially sector shaped apertures, and
    the outlet valve member can be rotated about the first axis between
    a) a shut off position where both of the inlet apertures are closed by the outlet valve member,
    b) a first inlet opened position where the first inlet aperture and the outlet aperture are aligned to allow fluid to flow from the first inlet port through the first inlet aperture via the outlet aperture to the outlet port, whilst at the same time the second inlet aperture is closed by the outlet valve member,
    c) a second inlet opened position where the second inlet aperture and the outlet aperture are aligned to allow fluid to flow from the second inlet port through the second inlet aperture via the outlet aperture to the outlet port, whilst at the same time the first inlet aperture is closed by the outlet valve member, and
    d) a mixing position wherein the outlet aperture overlaps with both of the inlet apertures to allow fluids to flow from said two inlet ports through the two inlet apertures and through the outlet aperture, and mix downstream of the outlet aperture so that the fluids can exit the outlet port.

2. A fluid mixing valve as claimed in claim 1, wherein the outlet valve member is a first valve disk.

3. A fluid mixing valve as claimed in claim 1, wherein the valve seat is a second valve disk and has an opposing surface on the other side of the disk from the contact surface.

4. A fluid mixing valve as claimed in claim 3, wherein the two adjacent inlet apertures of the second valve disk have a greater area in the plane of the contact surface of the second valve disk than in the plane of the opposing surface of the second valve disc.

5. A fluid mixing valve as claimed in claim 1, wherein the substantially sector shaped outlet aperture of the valve member at the plane of the outlet valve member contact surface has an angle of about 120 degrees at its apex.

6. A fluid mixing valve as claimed in claim 1, wherein the two adjacent substantially sector shaped inlet apertures of the valve seat at the plane of the valve seat contact surface, each have an approximately 90 degree apex.

7. A fluid mixing valve as claimed in claim 1, wherein the outlet aperture in the outlet valve member is in the shape of a removed sector.

8. A fluid mixing valve as claimed in claim 1, wherein the valve seat contact surface has a recessed region.

9. A servo actuated fluid mixing valve, comprising:
    a valve body having at least two fluid inlet ports and at least one fluid outlet port;
    a servo actuator attached to said valve,
    a valve seat having a valve seat contact surface adjacent an outlet valve member having an outlet member contact surface, the valve member being capable of being rotated about a first axis by said servo actuator,
    said valve seat having two adjacent inlet apertures there through separated by a dividing piece, and said valve seat having a closed area opposite the inlet apertures,
    a first said inlet aperture communicating with a first of said two inlet ports, and a second said inlet aperture communicating with a second of said two inlet ports, a barrier on the inlet side of the valve seat separating the fluid flow from said at least two inlet ports so that the two supplies of fluids do not mix until after they have passed through the two inlet apertures in the valve seat;
    said valve member having an outlet aperture there through and a sealing area,
    said outlet aperture communicating with said at least one outlet port,
    the valve member contact surface and the valve seat contact surface being arranged in substantially planar sealing contact with one another, and the valve member is capable of rotation relative to the valve seat, wherein,
    the outlet aperture of the valve member is substantially sector shaped at the plane of the valve member contact surface, with its sector apex at or close to the point of intersection of the first axis with the valve member and with its arc at or close to the outside of the valve member, the two adjacent inlet apertures of the valve seat are each substantially sector shaped at the plane of the valve seat contact surface with each having its sector apex close to the point of intersection of the first axis with the valve seat, the sealing area of the valve member is greater than or equal to the combined area of the two adjacent inlet substantially sector shaped apertures so that the sealing area of the valve member can cover and close the two adjacent inlet substantially sector shaped apertures, and the valve member can be rotated about the first axis between a) a shut off position where both of the inlet apertures are closed by the valve member, b) a first inlet opened position where the first inlet aperture and the outlet aperture are aligned to allow fluid to flow from the first inlet port through the first inlet aperture via the outlet aperture to the outlet port, whilst at the same time the second inlet aperture is closed by the valve member, c) a second inlet opened position where the second inlet aperture and the outlet aperture are aligned to allow fluid to flow from the second inlet port through the second inlet aperture via the outlet aperture to the outlet port, whilst at the same time the first inlet aperture is closed by the valve member, and d) a mixing position wherein the outlet aperture overlaps with both of the inlet apertures to allow fluids to flow from said two inlet ports through the two inlet apertures and through the outlet aperture, and mix downstream of the outlet aperture so that the fluids can exit the outlet port.

10. A servo actuated fluid mixing valve as claimed in claim 9, wherein the servo actuator includes a stepping motor.

11. A servo actuated fluid mixing valve as claimed in claim 9, further including a controller means.

12. A servo actuated fluid mixing valve as claimed in claim 9, further including a sensing means which is positioned and adapted to sense at least one parameter relating to any fluid which passes through the at least one fluid outlet port, allowing feed-back control of the valve.

13. A servo actuated fluid mixing valve as claimed in claim 12, further including a controller means.

14. A servo actuated fluid mixing valve as claimed in claim 12, wherein the servo actuator includes a stepping motor.

15. A servo actuated fluid mixing valve as claimed in claim 13, wherein the servo actuator includes a stepping motor.

16. A servo actuated fluid mixing valve as claimed in claim 9, further including a user interface means.

17. A servo actuated fluid mixing valve as claimed in claim 12, further including a user interface means.

18. A servo actuated fluid mixing valve as claimed in claim 15, further including a user interface means.

19. A servo actuated fluid mixing valve as claimed in claim 9, wherein the valve member is a first valve disk.

20. A servo actuated fluid mixing valve as claimed in claim 9, wherein the valve seat is a second valve disk and has an opposing surface on the other side of the disk from the contact surface.

21. A servo actuated fluid mixing valve as claimed in claim 20, wherein the two adjacent inlet apertures of the second valve disk have a greater area in the plane of the contact surface of the second valve disk than in the plane of the opposing surface of the second valve disc.

22. A servo actuated fluid mixing valve as claimed in claim 9, wherein the substantially sector shaped outlet aperture of the valve member at the plane of the valve member contact surface has an angle of about 120 degrees at its apex.

23. A servo actuated fluid mixing valve as claimed in claim 9, wherein the two adjacent substantially sector shaped inlet apertures of the valve seat at the plane of the valve seat contact surface, each have an approximately 90 degree apex.

24. A servo actuated fluid mixing valve as claimed in claim 9, wherein the outlet aperture in the valve member is in the shape of a removed sector.

25. A servo actuated fluid mixing valve as claimed in claim 9, wherein the valve seat contact surface has a recessed region.

26. A servo-controlled fluid mixing valve, comprising:

a valve body having at least two fluid inlet ports and at least one fluid outlet port;

a valve cavity housing a non-movable fixed inlet side valve disk adjacently contacting a single movable outlet side valve disk, the inlet side valve disk and the outlet side valve disk being arranged in substantially planar sealing contact with one another, the outlet side valve disk rotatable relative to the inlet side valve disk, the movable valve disk being rotatable about a first axis of motion to provide fluid mixing control and flow on/off control of fluids, via flow through the movable disk from the inlet ports to the outlet port, the movable outlet side valve disk being free of linear motion along the first axis;

a single stepper motor actuator operatively connected to the movable outlet side valve disk to rotate the movable outlet side valve disk about the first axis and provide the fluid mixing control and the flow on/off control through only rotatingly repositioning the movable outlet side valve disk by the stepper motor actuator;

said inlet side valve disk having two adjacent inlet apertures separated by a dividing piece, said inlet side valve disk being a closed area other than at the inlet apertures, a first of said inlet apertures communicating with a first of said two inlet ports, and a second of said inlet apertures communicating with a second of said two inlet ports, a barrier on the inlet side of the valve seat separating the fluid flow from said at least two inlet ports so that the two supplies of fluids do not mix until after they have passed through the two inlet apertures;

said movable outlet side valve disk having an outlet aperture there through and a sealing area, said outlet aperture communicating with said at least one outlet port, wherein, the outlet aperture of the outlet side valve disk substantially sector shaped at the plane of the outlet side valve disk with a sector apex at or adjacent a point of intersection of the first axis with the outlet side valve disk and with an arc at or adjacent an outside of the outlet side valve disk, and the two adjacent inlet apertures of the inlet side valve disk are each substantially sector shaped at the plane of the inlet side valve disk with each aperture having a corresponding sector apex adjacent to the point of intersection of the first axis with the inlet side valve disk, the sealing area of the outlet side valve disk is at least equal to a combined area of the two adjacent inlet substantially sector shaped apertures so that the sealing area of the outlet side valve disk can cover and close the two adjacent inlet substantially sector shaped apertures, and the outlet side valve disk can be rotated by the actuator about the first axis between a) a shut off position where both of the inlet apertures are closed by the outlet side valve disk, b) a first inlet opened position where the first inlet aperture and the outlet aperture are aligned to allow fluid to flow from the first inlet port through the first inlet aperture via the outlet aperture to the outlet port, whilst at the same time the second inlet aperture is closed by the outlet side valve disk, c) a second inlet opened position where the second inlet aperture and the outlet aperture are aligned to allow fluid to flow from the second inlet port through the second inlet aperture via the outlet aperture, to the outlet port, whilst at the same the first inlet aperture is closed by the outlet side valve disk, and d) a mixing position wherein the outlet aperture overlaps with both of the inlet apertures to allow fluids to flow from said two inlet ports through the two inlet apertures and through the outlet aperture, and mix downstream of the outlet aperture so that the fluids can exit the outlet port.

* * * * *